United States Patent
Schmelz et al.

(10) Patent No.: US 7,815,390 B2
(45) Date of Patent: Oct. 19, 2010

(54) RIVET OR SCREW CONNECTION OF A PLASTIC PART TO A FURTHER PART

(75) Inventors: Thomas Schmelz, Niesetal (DE); Eric Zimmermann, Kassel (DE); Marko Hermann, Eschwege (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 11/661,896

(22) PCT Filed: Sep. 23, 2005

(86) PCT No.: PCT/EP2005/010572

§ 371 (c)(1),
(2), (4) Date: Mar. 1, 2007

(87) PCT Pub. No.: WO2006/034867

PCT Pub. Date: Apr. 6, 2006

(65) Prior Publication Data

US 2008/0170907 A1      Jul. 17, 2008

(30) Foreign Application Priority Data

Sep. 30, 2004   (DE) ...................... 10 2004 048 835

(51) Int. Cl.
*F16D 1/033*   (2006.01)
(52) U.S. Cl. .................... 403/337; 403/408.1
(58) Field of Classification Search .............. 403/408.1, 403/274, 277, 337; 296/29, 191; 411/501, 411/504, 505, 509, 371.2, 435; 29/525.06, 29/524.1
See application file for complete search history.

(56) References Cited

U.S. PATENT DOCUMENTS

| | | | | |
|---|---|---|---|---|
| 1,773,146 | A | * | 8/1930 | Kellogg ...................... 411/435 |
| 2,695,688 | A | * | 11/1954 | Wollpert et. al. ............ 403/404 |
| 3,842,710 | A | * | 10/1974 | Poupitch ..................... 411/504 |
| 3,934,899 | A | | 1/1976 | Burk et al. |
| 4,080,768 | A | | 3/1978 | Trixl |
| 4,115,974 | A | * | 9/1978 | Purcell ....................... 296/191 |
| 4,707,020 | A | * | 11/1987 | Enokida et al. ............. 296/191 |

(Continued)

FOREIGN PATENT DOCUMENTS

CH            610069          4/1976

(Continued)

OTHER PUBLICATIONS

International Search Report of International Application No. PCT/EP2005/010572.

*Primary Examiner*—Michael P Ferguson
(74) *Attorney, Agent, or Firm*—Matthew B. Dernier, Esq.; Gibson & Dernier LLP

(57) ABSTRACT

A rivet or screw connection, comprising: a first component having a first through-opening; a second component having a second through-opening; and a rivet or screw having shank, wherein the first and second through-openings are arranged and penetrated by the shank of the rivet or screw, the rivet or screw comprises a rivet head, screw head or nut on both sides of the through-openings, having a diameter larger than diameters of the through-openings, and at least the first component comprises a pot-like recess near the rivet or screw extending towards the second component, on whose base the first through-opening is arranged.

12 Claims, 3 Drawing Sheets

U.S. PATENT DOCUMENTS

| | | | | |
|---|---|---|---|---|
| 4,924,584 A | * | 5/1990 | Harney | 403/277 |
| 5,018,329 A | * | 5/1991 | Hasan et al. | 411/377 |
| 5,150,944 A | * | 9/1992 | Yoshida et al. | 296/191 |
| 5,377,514 A | * | 1/1995 | Robbins et al. | 70/452 |
| 5,690,459 A | * | 11/1997 | Donovan et al. | 403/274 |
| 6,059,378 A | * | 5/2000 | Dougherty et al. | 301/124.1 |
| 6,062,790 A | * | 5/2000 | Huang | 411/531 |
| 2005/0235574 A1 | | 10/2005 | Gomez Camara et al. | |

FOREIGN PATENT DOCUMENTS

| | | |
|---|---|---|
| DE | 2352181 | 10/1973 |
| DE | 10018731 | 4/2000 |
| EP | 1488944 | 12/2004 |
| ES | WO2004035336 | 4/2004 |

* cited by examiner

RIVET OR SCREW CONNECTION OF A PLASTIC PART TO A FURTHER PART

BACKGROUND

The present invention relates to a rivet- or screw connection for connecting two components. Such connections, in particular are used in the field of vehicle construction, in particular motor vehicle construction.

Different connection methods are suitable for connecting two components. On the one hand, the components may be bonded or welded or also soldered to one another at suitable locations. Screw connections with which a screw is inserted through openings arranged to one another, in the two components, and are fixed with a nut or a rivet nut, are also used in order to create a detachable connection. A further alternative to a detachable connection are rivet connections, with which, instead of a screw, a rivet is pushed through the through-openings arranged in a flush manner in the two components to be connected, and subsequently upset. The rivet itself has a rivet head at its ends, which on account of its widening with respect to the shank of the rivet and the component openings, fastens the rivet on one side of the component. A widening is also created at the other end of the rivet by way of the upsetting, which here as in the following, is also likewise to termed under rivet head. This is because basically it is possible to insert the rivet with its shank from the one side, or also from the other side, through the through-openings into the components, and to introduce the upsetting then at the respective other side. What is merely decisive, is that finally widenings are present on both sides of the through-openings, which fasten the rivet in the through-openings.

The introduction of force from each component into the connection is effected via the respective rivet head, screw head or the nut, and is determined by the size of the head.

Thereby, rivet- and screw connections in particular are used for connecting components of metal, in particular of sheet metal.

SUMMARY OF THE INVENTION

It is the object of the present invention to provide a rivet- or screw connection, which permits a good force introduction with a simultaneous high stiffness of the fastening location.

A connection now is developed further according to the invention, in that at least one first component in the region of the connection comprises a pot-like recess in the direction of the second component. This recess comprises a base, advantageously a flat base, in which the rivet or screw opening is arranged. The pot thereby has a diameter which is larger than the diameter of the head of the rivet, screw or nut arranged in the pot. Such a pot-like recess, if it is observed from the other side of the first component, may also be considered as a dome-like raising, wherein the opening is arranged in the roof of the dome.

A three-dimensional structure results by way of the pot-like recess or dome-like raising, by way of which a stiffening of the first component in the region of the rivet or screw is effected. This is because the side walls of the pot-like recess stiffen the complete structure, and oscillations around the connection point are thus reduced or avoided.

A further advantage of such a pot-like recess lies in the fact that a distance arises between the first component and the second component, which corresponds to the depth of the pot-like recess. If for example seals are arranged between the first component and the second component, for example as a ring seal around the pot-like recess, the height of the pot-like recess may therefore be set such that the recess acts as a stopper (distancer), and limits the compression of the seal on fastening the two components on one another. This permits the respective seal to compress within its elastic range, so that a reliable sealing is ensured.

The connection according to the invention may be assembled in a very rapid and simple manner, and has a low weight. In particular, in comparison to the screw connections which were previously prevalent in the field of plastics, a considerably simplified assembly results with the use for a rivet connection according to the present invention.

Thereby, the connections according to the invention are adequately waterproof, so that they are able to compete with previous connections in every respect.

The connection according to the invention is particularly applied for connecting at least one first component of plastic, to a second component which may consist of metal or likewise of plastic, or may contain plastic. Rivet connections were previously not used in the field of plastic components due to technical difficulties.

If the diameter of the pot-like recess is significantly larger than the diameter of the rivet head, screw head or nut, then on account of the larger periphery of the wall of the recess compared to the periphery of the head, a significantly longer line for the force introduction from the connection into the component, or vice versa results. The force introduction however still takes place from the rivet head, the screw or the nut, into the base of the recess only in the region of the rivet head, the screw or the nut. In order here to achieve a sufficient force introduction, for this reason, the base of the recess may be designed in a manner which is reinforced with respect to the remaining first component. This however has the further advantage that this material thickness is only increased in the region of the base of the recess, whilst the material thickness in the remaining region of the first component may be kept low.

Thus as a whole, a long transition edge with a larger surface connecting results from the connection into the first component The transmittable forces are no longer limited by way of this, so that oscillations of the first components may be suppressed, and fractures in the first component are able to be prevented. The connection according to the invention is also very stable with large mechanical effects, such as in the case of a collision of a vehicle with such connections, onto an object.

Furthermore, with this connection as a rivet connection, it is not necessary to introduce a rivet mandrel into the through-openings. Such a direct riveting results in a simplification of manufacture and a cost saving.

A particularly advantageous connection results when the wall of the pot-like recess has no circular cross section, but for example is designed with a star geometry. With this geometry, the radius of the periphery of the wall is varied periodically along the periphery, so that dents and indentations of the wall result. By way of this, one achieves a connecting surface, which with the same size, corresponds to a multiple, e.g. one and a half times that of a circular wall. The contact stretch for introducing the forces into the connection from the first component is thus considerably increased, so that larger forces are capable of being transmitted.

The connection may of course not only comprise a pot-like recess for the first component, but also the second component may be designed in a corresponding manner. Inasmuch as this is concerned, that which was previously stated with regard to the first components and is to be stated hereinafter, also applies to the second component. It is therefore also possible for pot-like recesses of the first component and of the second component to be connected at their bases, with the connections according to the invention.

The connection according to the invention in particular serves for fastening functional modules, for example window-lifting devices or separating walls between the dry side and wet side in motor vehicles, in particular for fastening door modules on door inner sheet metal parts. Of course, the fastening on door outer sheet metal parts or other elements is also possible. With door outer sheet metal parts however, it results that the connection according to the invention should be arranged at regions which are not visible or which are hidden.

BRIEF DESCRIPTION OF THE DRAWINGS

One example of a rivet connection according to the invention is now specified. There are shown in.

DETAILED DESCRIPTION OF THE EMBODIMENTS

Figure 1:
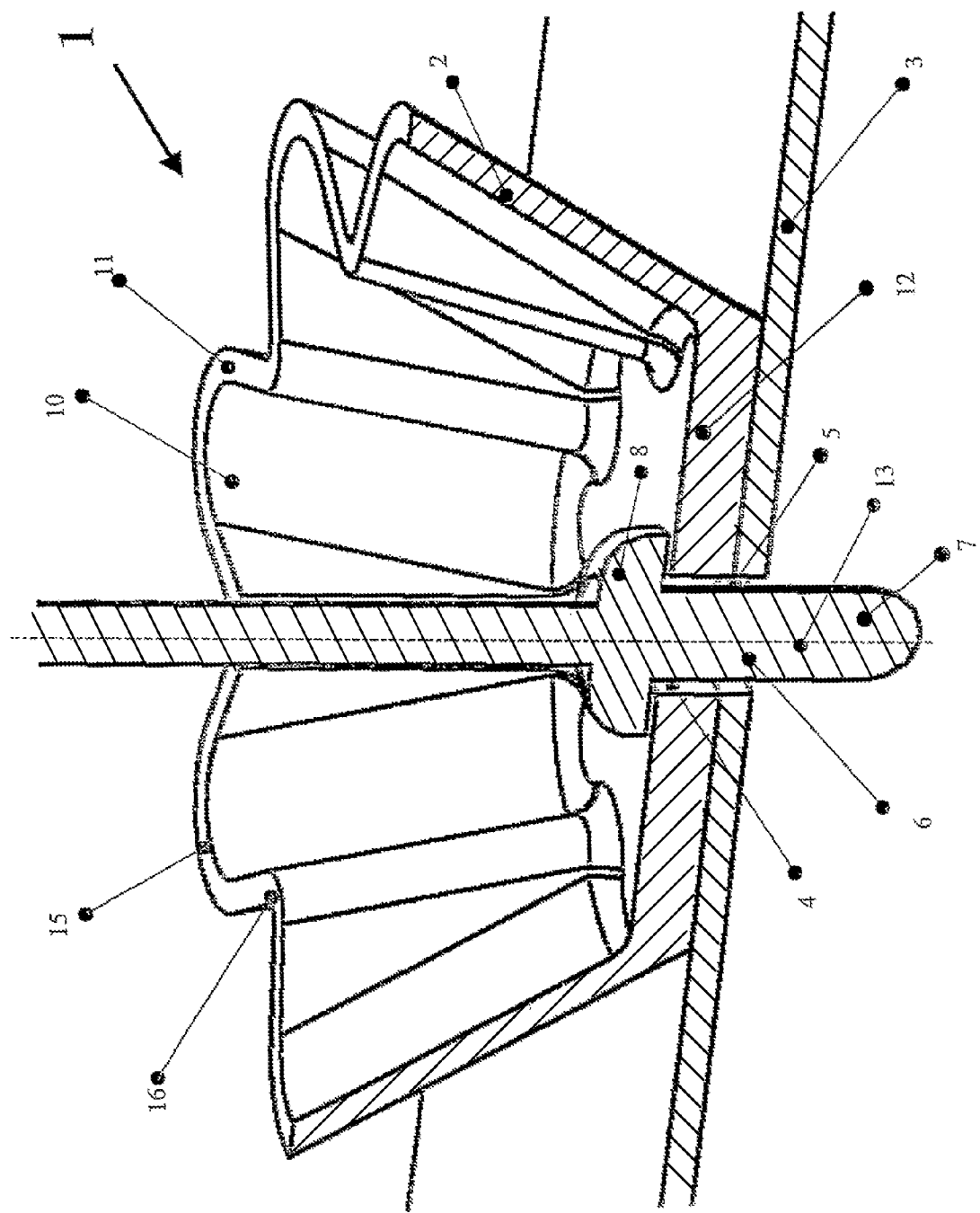
FIG. 1 the cross section of a rivet connection according to the invention, before the upsetting of the rivet.

Here, as in the following, the same or similar reference numerals are used for the same or similar components, so that under circumstances, there is no repeated description of these.

FIG. 1 shows the cross section through a rivet connection 1 for connecting first components 2 to a second component 3. The two components 2 and 3 comprise through-openings (rivet openings) 4 and 5 respectively, which are arrange flush to one another. A rivet 6 is inserted through these rivet openings 4 and 5, which with its rivet head 8 bears on that side of the component 2 which is distant to the connection, and thus fixes the component 2 in its position.

The rivet is shown in the non-upset condition, so that the second widening on that side of the component 3 distant to the connection 3 may not bee seen. Such a widening, in accordance with the rivet head 8, may likewise be termed as a rivet head.

As a result, the rivet 6 with its shank 7 penetrates the first opening 4 and the second opening 5, wherein in the present example, the axis 13 of the rivet shank 7 is perpendicular to the connection surface between the components 2 and 3.

Figure 3:
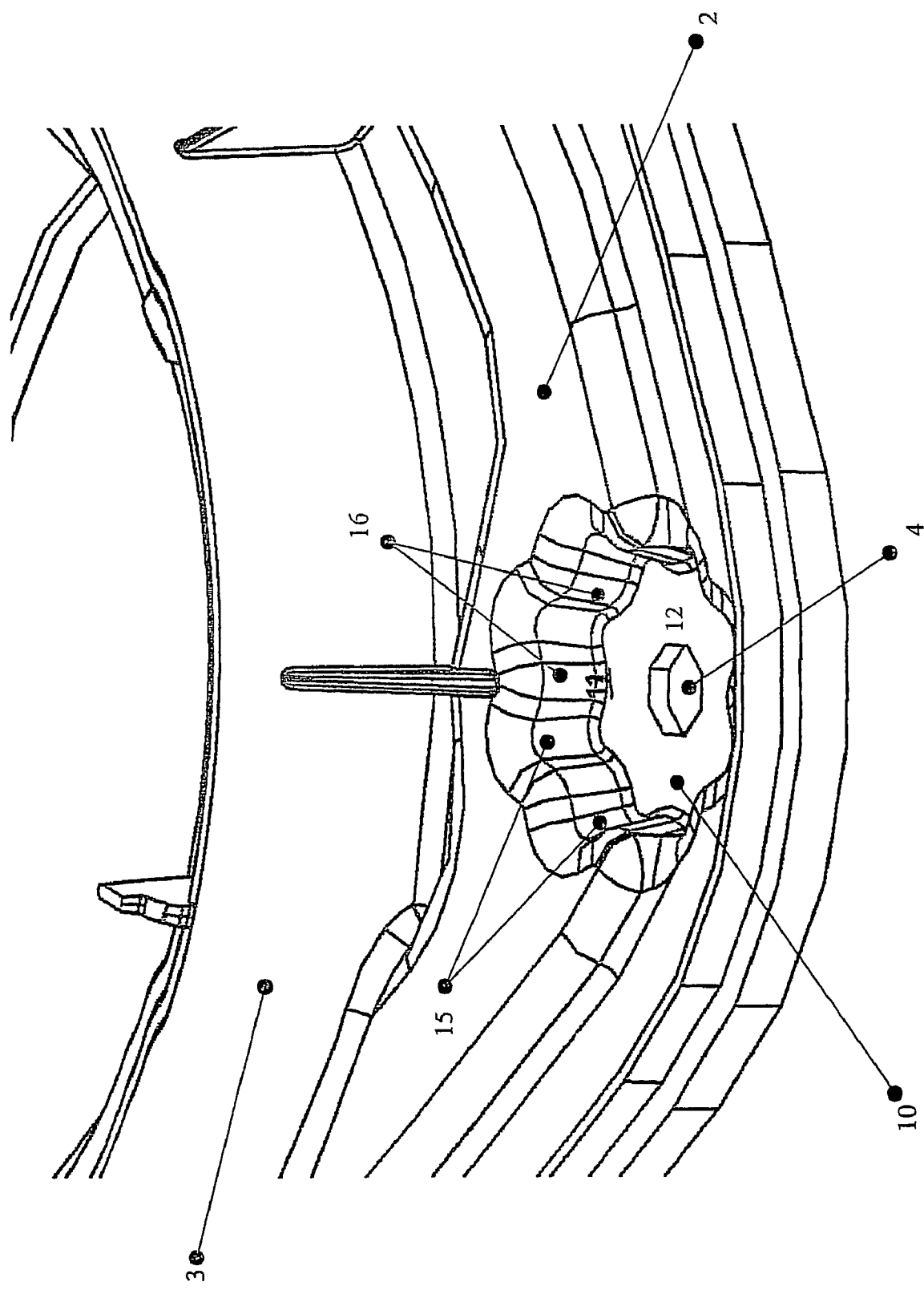
FIG. 3 a view of a first component with a rivet connection, according to the invention.

The component 2 has a pot-like recess 10, wherein of the component 2, only this recess is represented. The component 2 extends laterally from the upper edge of this pot-like recess 10, wherein this extension is not presented further, but is shown in FIG. 3 for example. The pot-like recess 10 has a wall 11 which runs conically around an axis 13. Of this recess 10 in the cross section of FIG. 1, only a half-shell is shown. The recess 10 comprises a plane, flat base 12 which bears on the component 3 which is likewise flat in the region of the rivet connection, in a flat manner, and defines the connection surface. The wall 11 is corrugated, so that it comprises dents 15 and indentations 16. The cross section of the wall in a plane perpendicular to the axis 13 thus has a star-shaped, flower-shaped or cupcake-like shape. The length of the wall 11 in cross section is significantly larger than with a circular cross section, due to this star-shaped design. In the present example, this length is larger by a factor of 1.8 than with a circular cross section, so that a contact stretch between the base 12 of the recess and thus of the rivet 6, and the remainder of the component 1 which is not shown here, which is length-ened by a factor of 1.8, results. The introduction of force from the component into the rivet and vice versa is significantly improved by way of thus.

In this example of a door module 2 of plastic, the diameter of the opening 4 is 7.5 mm, the diameter of the rivet shank 6.4 mm, the thickness of the base 12 2.5 mm and the thickness of the component 3 0.8 mm.

Figure 2:
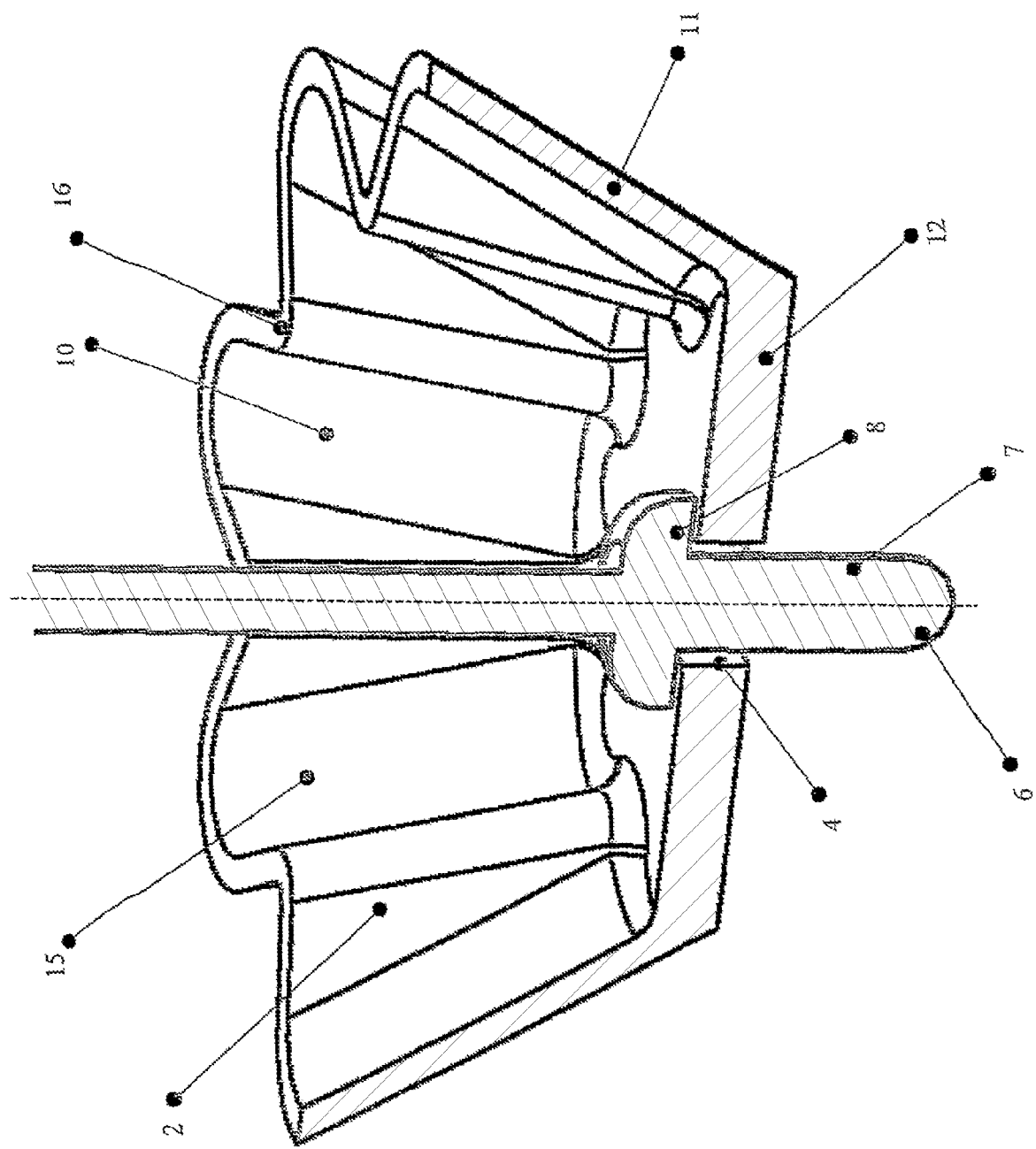
FIG. 2 a cross section through such a rivet connection.

FIG. 2 shows the same rivet connection, wherein however only the recess 10 and the likewise not yet upset rivet 6 are represented.

FIG. 3 shows a door module 2 and a loudspeaker element 3 which are connected to one another.

The door module 2 here comprises a pot 10 which has a first rivet opening 4. This rivet opening 4 is located centrally in the base 12 of the pot 10. The wall 11 again has dents 15 and indentations 16, so that a star-shaped cross section of the wall 11 results. The door module 2 extends laterally from that edge of the wall 11 which is distant to the base 12, and parallel to the flat base 12 to the outside. It is in this region then, that the functional elements of the door module 2, for example the loudspeaker element 3 or a window lifting device, are attached.

In a further example according to the FIGS. 1 to 3, the rivet is replaced by a screw or a nut, wherein the nut for its part is welded or fastened in another manner on the door inner sheet metal part.

The invention has the advantage, that it may also be manufactured in a simple and inexpensive manner also in large-scale manufacture.

Thus the pot-like recess is also favourable particularly with regard to injection moulding technology. The angular arrangement in particular ensures that the flow behaviour of the injection moulding material (preferably plastic, this may be particularly preferably designed as a plastic with the addition of fibres, such as PPLGF=polypropylene with long glass fibres). Flow problems are largely avoided by way of this. The removal from the mould is accordingly simpler.

It is also advantageous that this pot-like recess may also be easily manufactured in metallic materials. In particular, the shapes of the wall which have a variable shape with regard to the periphery (star-shape for example) may also be easily manufactured in a punching- or embossing process without a local over-stressing of the material occurring.

Finally, a large advantage exists with regard to stability. The region around the through-bore of the rivet or of the screw is greatly stiffened by the pot-like recess (in particular if this wall of the pot-like recess is varied with regard to the periphery, i.e. is corrugated). Fractures and a warping in the region directly around the through-opening no longer occurs, since due to the stiffened pot structure (in particular if this is corrugated, star-shaped, etc.), the forces are distributed onto a larger surface in a uniform manner. One advantage e.g. of a waved, star-shaped wall lies in the fact, that a transition into adjacent geometries is more simply possible by way of its variable design.

The invention may be applied in the field of automobiles in a comprehensive manner.

Thus for example one advantageous, embodiment may envisage the first as well as second component having corresponding pot-like recesses, which are shaped complementarily to one another. On the one hand the positioning and on the other hand an even better stiffening is achieved by way of this (a counter-shape for achieving an improved positioning is however not absolutely necessary, since—at least with door modules—one usually applied a locator system (RPS)).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A rivet or screw connection of a first component to a second component, the connection comprising:
    the first component comprising a planar member having a first side and an opposing second side, and a pot-shaped recess extending through the planar member; the pot-shaped recess comprising:
    a base substantially parallel to the first side and axially offset from the second side in a direction opposite the first side, a first through-opening being concentrically arranged on and axially extending through the base, and
    a conical annular wall extending between the first side and the base, tapering toward the base, and having a wall thickness defined by an inner wall surface and an outer wall surface, the inner and outer surfaces having a plurality of corresponding dents and indentations circumferentially spaced around the base and defining a radius which is varied over the periphery of the wall, the varied radius stiffening the wall such that oscillations between the first and second components are reduced;
    the second component comprising a planar member having a first side and an opposing second side, a second through-opening extending between the first and second sides of the second component and axially aligned with the first through-opening, and
    a rivet or screw comprising a shank extending through the first and second through-openings, and the rivet or screw on each respective side of the through-openings comprising one of a rivet head, a screw head and a nut with a diameter larger than a diameter of the through-openings and clamped against a respective one of the base of the recess and the second side of the second component such that the rivet or screw retains the connection between the first and second components;
    wherein the inner wall surface adjoining the base has a radius which is larger than the radius of the respective rivet head, screw head or nut arranged on the base, such that the rivet head, the screw head, or the nut is distanced from, and not in contact with the wall of the recess.

2. A rivet or screw connection according to claim 1, wherein a diameter d1 of the recess in a region of the base and a diameter d2 of the respective rivet head, screw head or nut are at least one of: d1>1.5*d2, and d1>2*d2.

3. A rivet or screw connection according to claim 1, wherein the wall along its periphery, is corrugated.

4. A rivet or screw connection according to claim 1, wherein the wall along its periphery, in a plane perpendicular to an axis of the rivet or screw shank, has a star-shaped cross section.

5. A rivet or screw connection according to claim 1, wherein the wall has such a cross section along its periphery that a section between the wall and a plane perpendicular to an axis of the rivet or screw shank, at least three first locations, has a local minimal distance to the axis of the rivet or screw shank, and at least three further locations, each arranged between the three first locations, has a local maximal distance to the axis of the rivet or screw shank.

6. A rivet or screw connection according to claim 1, wherein the base of the recess of the first component has a larger thickness than regions of the first component connecting to the wall of the recess outside the recess.

7. A rivet or screw connection according to claim 1, wherein the first component and/or the second component at least partly contains plastic.

8. A rivet or screw connection according to claim 1, wherein the recess of the first component at least partly contains plastic.

9. A rivet or screw connection according to claim 1, wherein the second component is a door inner sheet metal part of a door of a vehicle.

10. A rivet or screw connection according to claim 1, wherein the first component is a door module, a window lifting device, or a separating wall between a wet side and a dry side of a door of a vehicle.

11. An apparatus comprising:
    a first component comprising a planar member having a first side and an opposing second side, and a pot-shaped recess extending through the planar member; the pot-shaped recess comprising:
    a base substantially parallel to the first side and axially offset from the second side in a direction opposite the first side, a first through-opening being concentrically arranged on and axially extending through the base, and
    a conical annular wall extending between the first side and the base, tapering toward the base, and having a wall thickness defined by an inner wall surface and an outer wall surface, the inner and outer surfaces having a plurality of corresponding smoothly transitioning dents and indentations circumferentially spaced around the base and defining a radius which is varied over the periphery of the wall, the varied radius stiffening the wall such that oscillations between the first and second components are reduced;
    a second component comprising a planar member having a first side and an opposing second side, a second through-opening extending between the first and second sides of the second component and axially aligned with the first through-opening, and
    a fastener comprising a shank extending through the first and second through-openings, and comprising a retaining feature on each end of the shank adjacent each respective side of the first and second through-openings and clamped against a respective one of the base of the recess and the second side of the second component such that the first and second components are coupled together;
    wherein the inner wall surface adjoining the base has a radius which is larger than the radius of the respective retaining feature arranged on the base, such that the retaining feature is distanced from, and not in contact with the wall of the recess.

12. The apparatus of claim 11, wherein at least one of:
    the inner wall surface is corrugated along its periphery;
    the periphery of the inner wall surface has a star-shaped cross section in a plane perpendicular to an axis of the shank of the fastener; and
    the periphery of the inner wall surface has a cross section such that: (i) local minimal distances to the axis of the shank of the fastener exist at least three first locations, and (ii) respective local maximal distances to the axis of the shank of the fastener exist between each of the three first locations.

* * * * *